United States Patent [19]

Bousquet

[11] 4,413,796

[45] Nov. 8, 1983

[54] AIRFOIL SHAPE FOR AIRCRAFT

[75] Inventor: Jean Bousquet, Blagnac, France

[73] Assignee: Societe Nationale Industrielle et Aerospatiale, Paris, France

[21] Appl. No.: 292,837

[22] Filed: Aug. 14, 1981

Related U.S. Application Data

[63] Continuation of Ser. No. 11,156, Feb. 12, 1979, abandoned.

[30] Foreign Application Priority Data

May 29, 1978 [FR] France ............................... 78 15926

[51] Int. Cl.³ ............................................... B64C 3/26
[52] U.S. Cl. .................................................. 244/35 R
[58] Field of Search ................ 244/34 R, 35 R, 35 A, 244/123

[56] References Cited

U.S. PATENT DOCUMENTS 3,952,971 4/1976 Whitcomb ......................... 244/35 R
4,072,282 2/1978 Fulker et al. ...................... 244/35 R
4,121,787 10/1978 Wilby ................................ 244/35 R

OTHER PUBLICATIONS

Haines, "Computer-Aided Design Aerodynamics", Aeronautical Journal, Mar. 1979, pp. 81-91.

Primary Examiner—Galen L. Barefoot
Attorney, Agent, or Firm—Merriam, Marshall & Bicknell

[57] ABSTRACT

The invention relates to an airfoil shape for flight at high subsonic speeds, of the type comprising a flat convex upper surface, a thick leading edge and a lower surface convex towards the leading edge and concave towards the trailing, in which airfoil the upper surface comprises a maximum curvature in the vicinity of its rear part, in a zone delimited by points located at distances from the leading edge equal to 65 and 90% of the chord of the airfoil. The invention is applicable to the production of fixed or rotary wings for aircraft, having a high divergence Mach number and a low drag.

18 Claims, 7 Drawing Figures

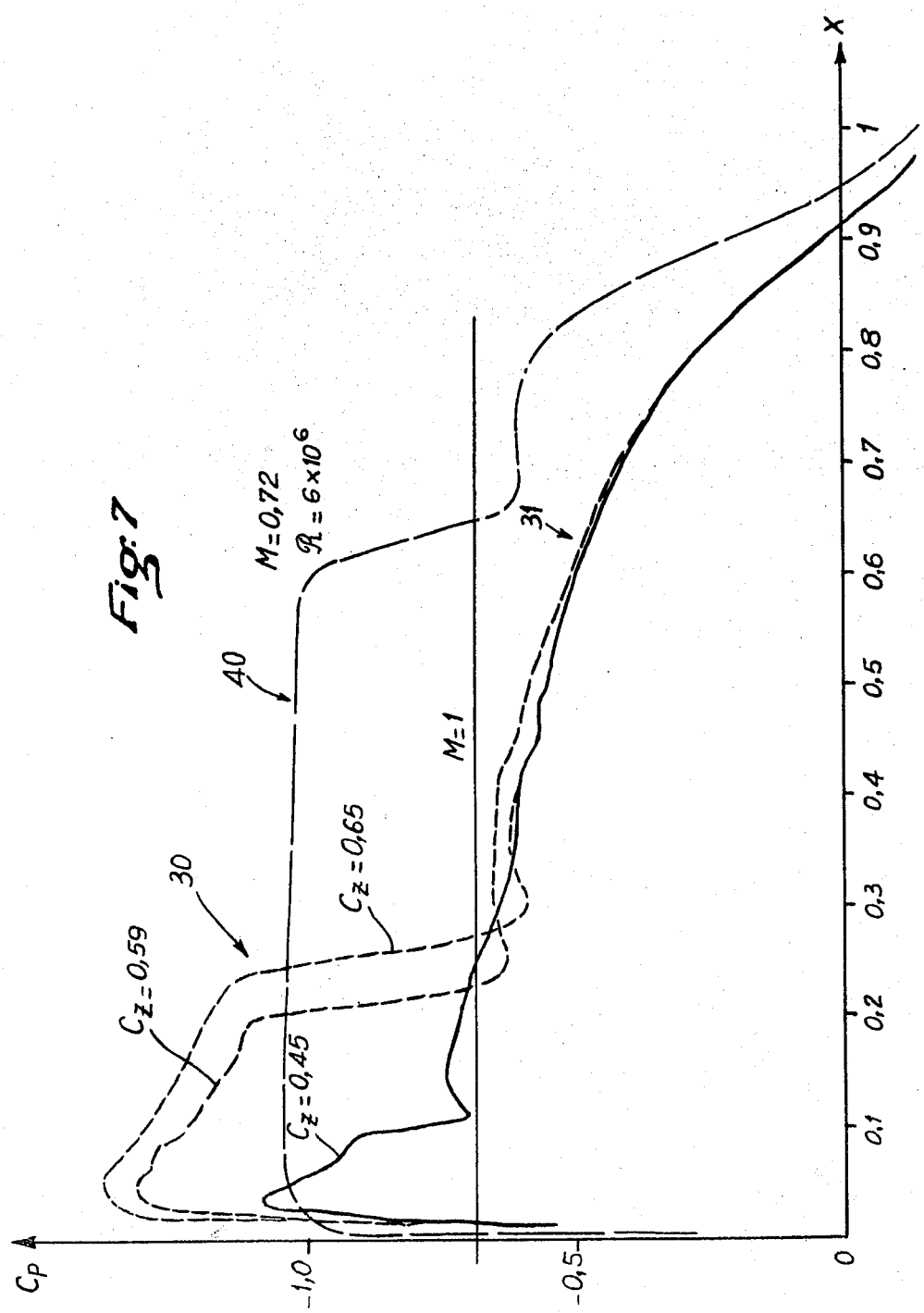

AIRFOIL SHAPE FOR AIRCRAFT

This is a continuation of application Ser. No. 11,156, filed Feb. 12, 1979, now abandoned.

The present invention relates to an airfoil shape for aircraft. It is applicable more particularly, but not exclusively, to the production of the fixed wing of an aircraft travelling at high subsonic speeds, i.e. at Mach numbers which may be higher than the critical Mach number. It will, moreover, be explained hereinafter more particularly in relation with this application. However, the invention may also be applied to the production of the wing of an aircraft with rotary wings.

It is known that if, for a given coefficient of lift $C_Z$ of the wing of an aircraft, the curve is plotted giving the coefficient of drag $C_X$ as a function of the speed of this aircraft, for example expressed in Mach number M, the transition between the domain of subsonic flight and the domain of trans-sonic flight is marked by the beginning of a sudden increase in the coefficient of drag $C_X$. By convention, drag divergence Mach number $M_{DX}$ designates the Mach number where the increase appears and where the slope $\partial C_X/\partial M$ of said curve is equal to 0.1. Generally, the drag divergence Mach number $M_{DX}$ is slightly higher than the critical Mach number. It depends, in fact, on the thickness of the airfoil and on the coefficient of lift, but, for a good conventional airfoil, may be in the region of 0.7.

It is, of course, advantageous to postpone the appearance of this phenomenon of increase of the coefficient of drag, also called "divergence of drag" as much as possible towards the high speeds. To this end, it has already been thought to give the wing a sweep-back with respect to the longitudinal axis of the aircraft. However, the results obtained are not completely satisfactory.

Furthermore, with the same purpose of increasing the drag divergence Mach number, airfoils have already been proposed which comprise a flat convex upper surface, a thick leading edge and a lower surface convex towards the leading edge, but concave towards the trailing edge, i.e. comprising a point of inversion of curvature. Such airfoils are designed to obtain on the upper surface of quasi-uniform relatively extended zone of supersonic speed which is, however, sufficiently stable to maintain as long as possible a flow without considerable discontinuity. These airfoils, functioning in this manner, are sometimes qualified as "supercritical". Due to them, the drag divergence Mach number presents a notable gain with respect to a good conventional airfoil, for example of the order of 0.1

The main object of the present invention is an airfoil shape for an aircraft travelling at high subsonic Mach numbers, but lower than 1, which airfoil, whilst presenting a general aspect recalling the so-called "supercritical" airfoils, functions quite differently to allow, with equal lift, the drag to be rendered minimum, after optimisation of the contour. The airfoil according to the invention, also capable of functioning perfectly at low subsonic speeds, presents a drag divergence Mach number of the same order as that of the best present airfoils, as well as a high lift. As will be seen hereinafter, the airfoil according to the invention even makes it possible to obtain a range of values of the coefficient of lift in which the maximum divergence Mach number presents a substantially constant value. Furthermore, these results of the airfoil according to the invention are obtained for thicknesses of said airfoil allowing a good spaciousness, for example for the arrangement of large-capacity fuel tanks.

To these ends, according to the invention, the airfoil shape for flight at high subsonic speeds, of the type comprising a flat convex upper surface, a thick leading edge and a lower surface convex towards the leading edge and concave towards the trailing edge, is noteworthy in that the upper surface comprises a maximum curvature in the vicinity of its rear part, in a zone delimited by points located at distances from the leading edge equal to 65 and 90% of the chord of the airfoil, and, at this point of maximum curvature of the rear part of the upper surface, the thickness of the airfoil is close to 3/10ths of the maximum thickness thereof. In the zone of the airfoil preceding said point and possibly in the zone of the airfoil containing this point, the variation of the thickness of the airfoil is advantageously a linear function, decreasing towards the trailing edge. Such a zone with linear variation of the thickness of the airfoil may extend from the mid-chord up to 80% thereof, counted from the leading edge, and even almost up to the trailing edge.

Due to these arrangements, a low drag, an increased local lift at the front of the airfoil and a perfect stabilisation of the boundary layer in all the domains of flight, as well as an excellent behaviour at low subsonic speeds, particularly in the landing and take-off phases, are obtained. This is due to a subsonic zone developing on more than the rear half of the upper surface, of which subsonic zone the convex distribution of the speeds is established without excessive pressure gradient, the distribution of the speeds being moderately variable in the major front part of the airfoil with an overspeed zone near the leading edge. The recompression of the fluid at the rear of the airfoil is therefore effected under optimum conditions.

The airfoil according to the invention is particularly applied to airfoils whose relative maximum thickness (i.e. with respect to the length of the chord) is between 11 and 15%.

When the maximum relative thickness of the airfoil is for example 12.58%, the point of maximum curvature of the rear part of the upper surface is at 85% of the chord from the leading edge and the radius of curvature at this point of maximum curvature may be equal to 172% of the value defining the chord of said airfoil.

To further improve the performances of the airfoil according to the invention, concerning the reduction of the drag, it is advantageous if the tangents at the points of the lower surface and the upper surface located at the trailing edge form an angle whose tangent is between 2 and 2.3 times the maximum relative thickness i.e., the ratio of the maximum thickness to the length of the chord. Thus, for a maximum relative thickness of 12.58%, this angle may be included between 15 and 16°. Furthermore, the trailing edge is not thick, its thickness being at the most equal to 0.5% of the length of the chord.

The lower surface advantageously also comprises a point of maximum concave curvature in a zone delimited by points located at distances from the leading edge equal to 70 and 93% of the chord of the airfoil and at this point of maximum concave curvature of the lower surface, the thickness of the airfoil is close to half the maximum thickness thereof. When the relative thickness of the airfoil is 12.58% of the chord, the point of maximum curvature is at 76% of the chord from the leading edge and the radius of curvature at this point is equal to 132% thereof. Furthermore, it is advantageous if, in a region comprised between 12 and 25% of the chord from the leading edge, the lower surface presents an at least substantially constant convex curvature. In the particular case of a maximum relative thickness of 12.58%, the radius of curvature of this region of substantially constant curvature of the lower surface may be equal to 179% of the chord.

The lower surface then preferably presents a point of maximum convex curvature between 30 and 45% of the chord from the leading edge. In the example of an airfoil of maximum relative thickness of 12.58%, this point of maximum curvature is located at about 37% of the chord and the radius of curvature at this point is 119% of said chord. Furthermore, if a system of rectangular axes OX, OY is chosen such that the point 0 is located at the leading edge, whilst the axis OX coincides with the chord and the axis OY coincides with the tangent to the leading edge, on which axes are plotted the reduced abscissae and ordinates, i.e. relative to the length of the chord, the contour of the lower surface and/or the contour of the upper surface follow, as a function of the reduced abscissa X, a law of evolution such that the reduced ordinates $Y_1$ and $Y_2$ of the points of the lower surface and the upper surface are respectively equal, at least on the greater part of the airfoil, to the product of the maximum thickness $e_{max}$ of the airfoil by a function of the reduced variable X. Moreover, the total thickness $Y_O$ of the airfoil at one point may itself be equal to the product of the maximum thickness $e_{max}$ of the airfoil by a function of X. Thus, the airfoil according to the invention verities at least approximately the following equations:

$$Y_1 = e_{max} \cdot f(X)$$

$$Y_2 = e_{max} \cdot g(X)$$

$$Y_0 = e_{max} \cdot h(X).$$

For example, in the leading edge zone up to a reduced abscissa comprised between about 0.1 and 0.16, as well as in the trailing edge zone from a reduced abscissa comprised between about 0.76 and 0.85, the lower surface is formed of consecutive portions of curves responding to the general formula $$Y = e_{max} \cdot [a\, X^{3/2} + b\, X^{\frac{1}{2}} + c].$$

a,b,c being positive or negative constants, associated with each of said portions of curves. Similarly, from the leading edge to the trailing edge, the upper surface may be formed by consecutive portions of curves responding to the general formula $$Y = e_{max} \cdot [k_1 X^{3/2} + k_2 X^{\frac{1}{2}} + m].$$

$k_1$, $k_2$ and m being positive or negative constants, associated with each of said portions of curves. Likewise by way of example, in a median part comprised approximately between reduced abscissae equal to 0.1 and to 0.6, the thickness $Y_O$ of the airfoil follows a law of general formula:

$$Y_O = e_{max} \cdot [p\, X + q\, X^2]^{\frac{1}{2}}.$$

p and q being positive or negative constants. Furthermore, in its intermediate part comprised approximately between reduced abscissae equal to 0.5 and 0.8 and even between 0.5 and 1, the thickness $Y_O$ of the airfoil may follow a law of general formula $$Y_O = e_{max} \cdot [r\, X + s]$$

r and s being positive or negative constants.

The invention will be more readily understood on reading the following description with reference to the accompanying drawings, in which.

Figure 2:
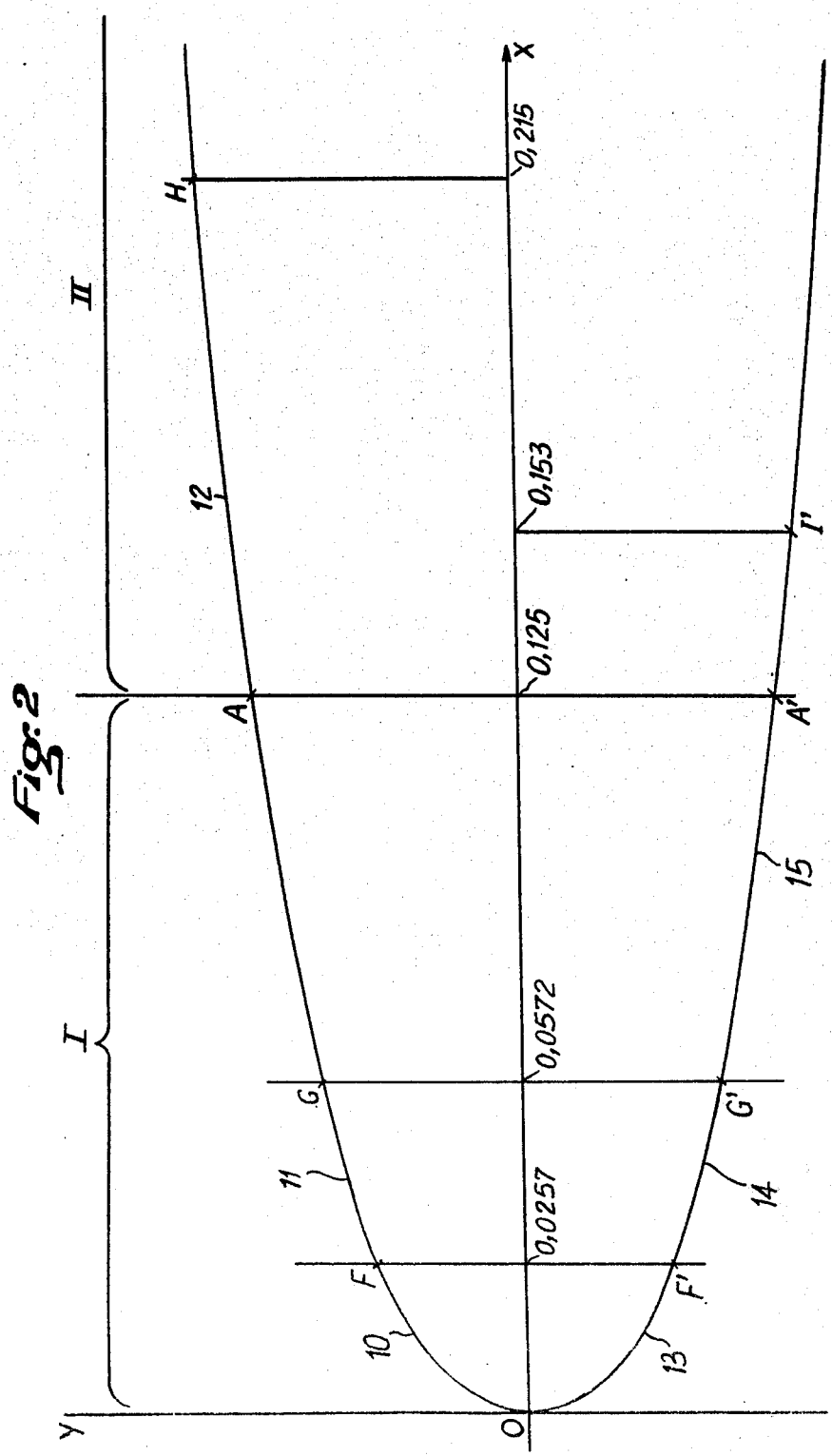
FIG. 2 illustrates, on a larger scale, the front part of the airfoil according to the invention, in the particular case of a maximum relative thickness of 12.58%.
Figure 3:
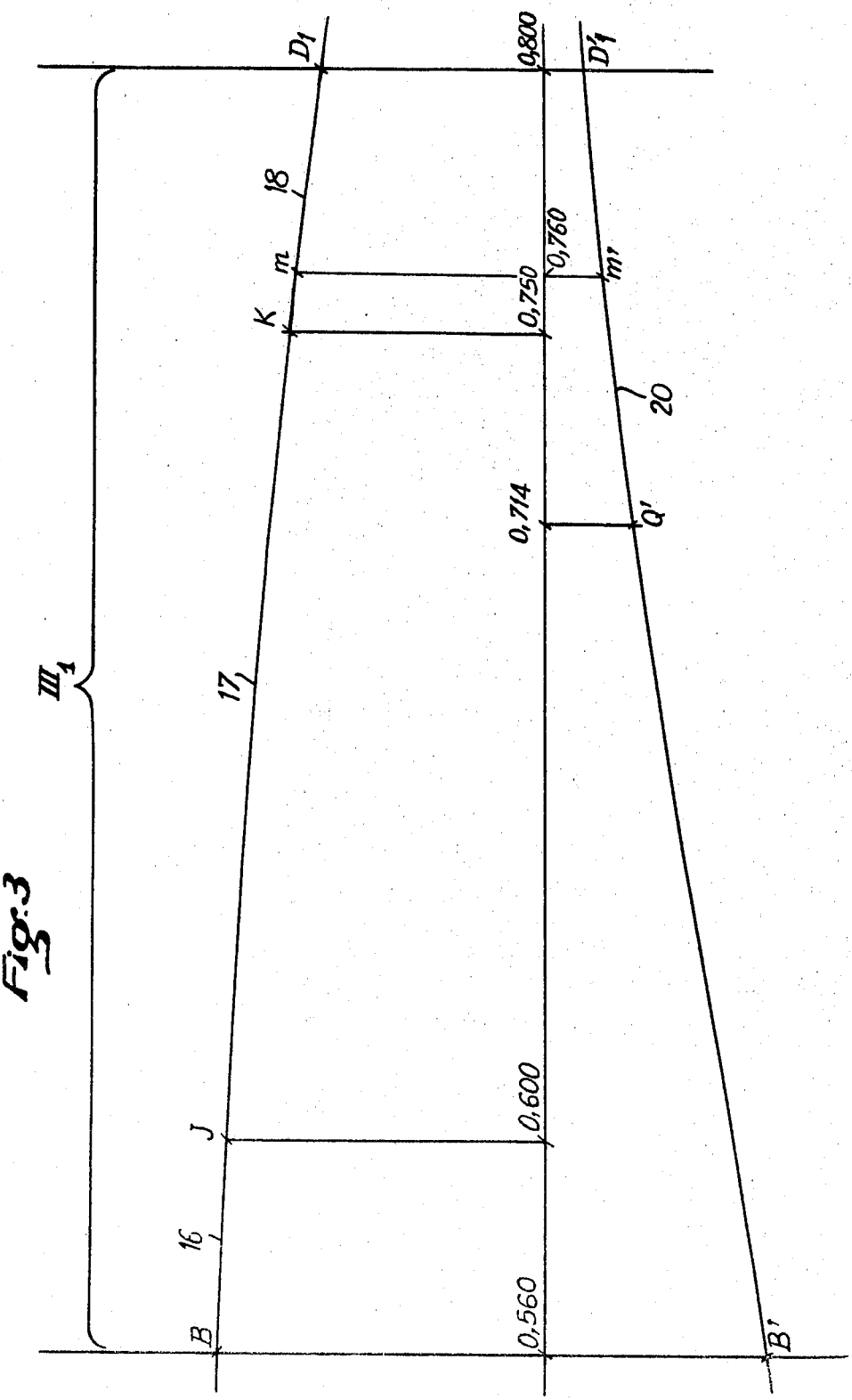
FIG. 3 illustrates, on a larger scale, the intermediate part of the airfoil according to the invention, in the particular case of a maximum relative thickness of 12.58%.
Figure 4:
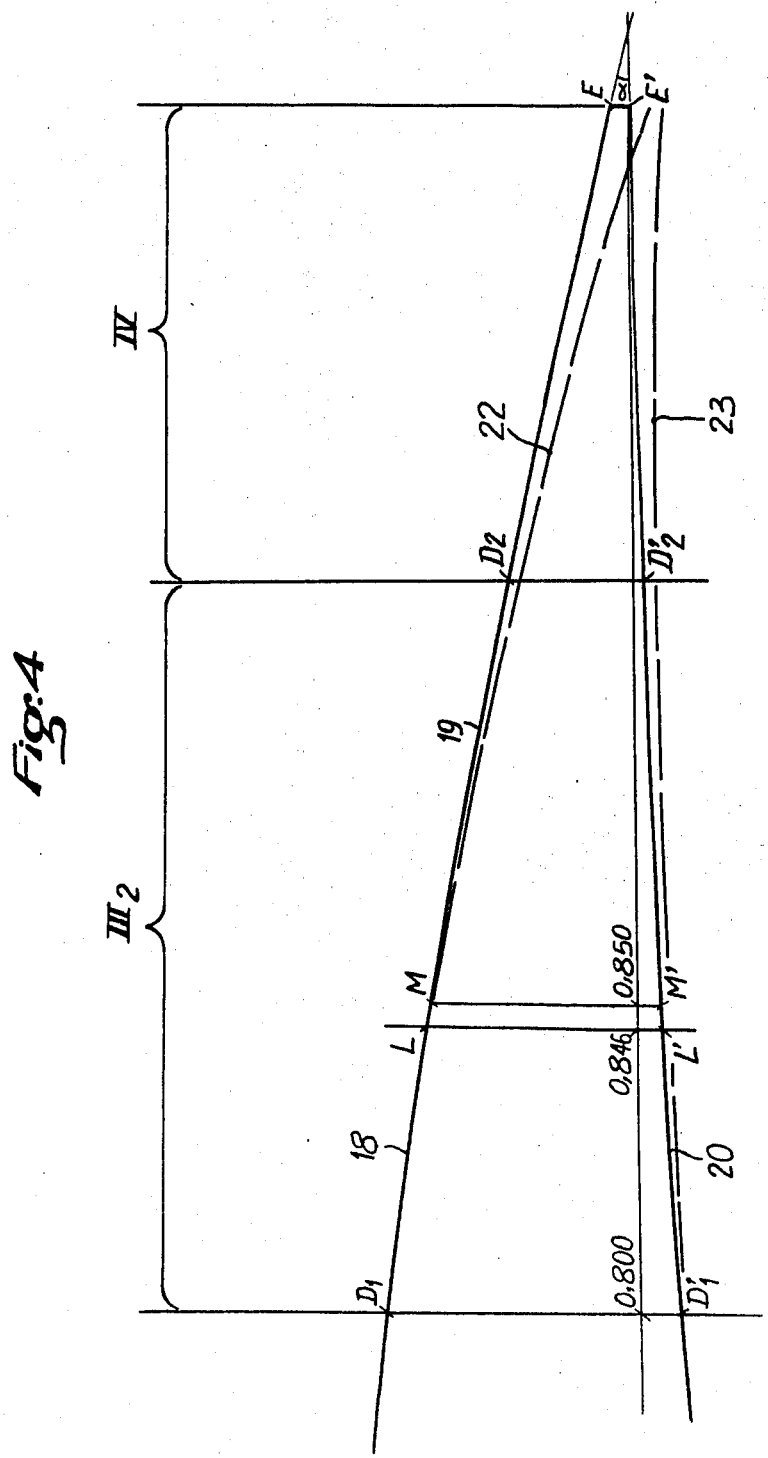
FIG. 4 illustrates, on a larger scale, the rear part of the airfoil according to the invention, in the particular case of a maximum relative thickness of 12.58%.
Figure 6:
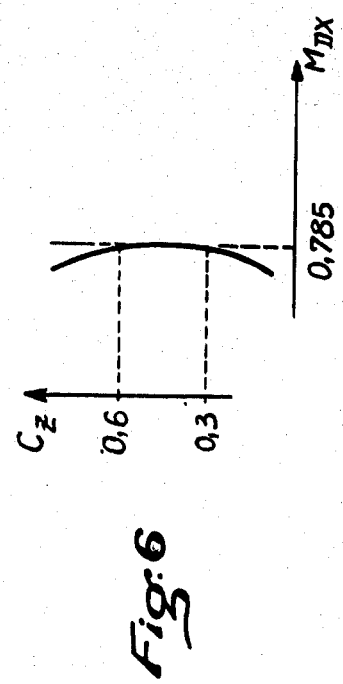

FIG. 6 schematically shows the characteristic curve of the lift as a function of the divergence Mach number, for the embodiment of FIGS. 2 to 4.

FIG. 7 shows the variation of the coefficient of presence along the chord of the airfoil, for a Mach number about equal to 0.72.

Figure 1:
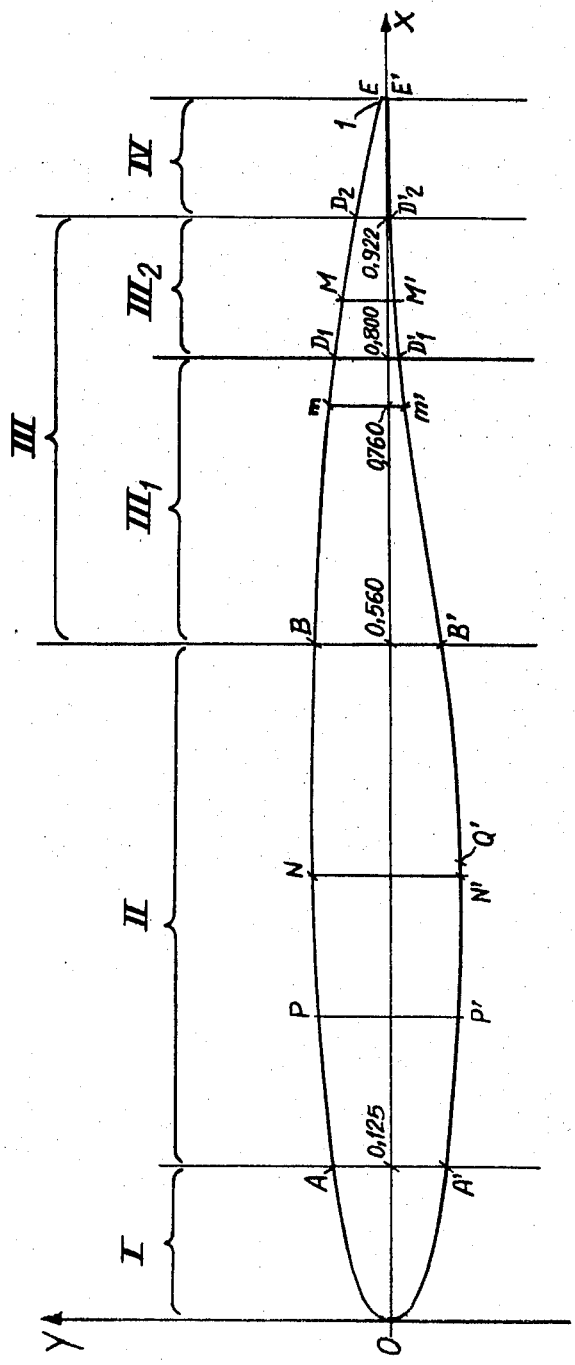
FIG. 1 is a schematic view, on a small scale, of an airfoil according to the invention.

Referring now to the drawings, the airfoil or blade shape according to the invention, shown schematically as a whole in FIG. 1, is related to a system of rectangular axes OX, OY, such that the point 0 merges with the leading edge of said airfoil, the axis OX merging with the chord or said airfoil and the axis OY being tangential to the leading edge. Reduced abscissae X and ordinates Y, i.e. related to the length c of the chord of the airfoil, are borne respectively on axes OX and OY.

This airfoil may, for the convenience of its description, be divided longitudinally into four successive parts I, II, III and IV. The part I, or leading edge zone, in included between the points $X=0$ and $X=0.125$ for example. The consecutive part II, or medium zone, is included between points $X=0.125$ and $X=0.560$, for example. Part III, or intermediate rear zone, is included between point $X=0.560$ and $X=0.922$ for example, this part III itself being able to be subdivided into a front part $III_1$ and a rear part $III_2$, of which the common boundary is for example determined by the point of abscissa $X=0.800$. Finally, the part IV, or trailing edge zone, is included between points $X=0.922$ and $X=1$.

In known manner, this airfoil comprises an upper surface part A B $D_1$ $D_2$ E of small curvature, a thick leading edge part A O A' of which the curvature evolves rapidly on either side of point 0, and a lower surface part A' B' $D'_1$ $D'_2$ E', convex towards the leading edge and concave towards the trailing edge.

Points A, A'-B,B'-$D_1$,$D'_1$-$D_2$,$D'_2$ and E, E' are respectively the points of the upper surface and of the lower surface corresponding to the reduced abscissae 0.125–0.560–0.800–0.922 and 1.

According to the invention, in part III, and more precisely in the zone of part $III_1$ adjacent part $III_2$ or in this part $III_2$ itself, the upper surface comprises a maximum curvature. In FIG. 1, this maximum curvature has been shown at point M of abscissa $X=0.850$. At point M, the thickness MM' of the airfoil is close to 3/10ths of the maximum thickness NN'=$e_{max}$ of the airfoil. Furthermore, in zone $III_1$ and possibly zone $III_2$, the evolution of the thickness of the airfoil is a linear function of the abscissa X, decreasing on approaching the trailing edge EE'.

Moreover, in zone III, the lower surface comprises a point of maximum concave curvature. In FIG. 1, this maximum curvature has been shown at point m' of abscissa X=0.760. At point m', the thickness mm' of the airfoil is close to half the maximum thickness NN'=$e_{max}$.

The part of the lower surface comprised approximately between the point A' and point P', for which X=0.250, present a substantially constant curvature, whilst in a zone delimited by the abscissae X=0.300 and X=0.450, the lower surface comprises a point Q' of maximum curvature. In FIG. 1, the abscissa of point Q' is X=0.370.

Furthermore, on at least the greater part of the airfoil, the line $Y_1$ of the lower surface and line $Y_2$ of the upper surface verify at least approximately the following general equations:

$$Y_1 = e_{max} \cdot f(X)$$

$$Y_2 = e_{max} \cdot g(X)$$

$$Y_0 = e_{max} \cdot h(X)$$

in which the functions f(X), g(X) and h(X) will be defined hereinafter, with other particularities of the airfoil, with regard to the detailed FIGS. 2 to 4.

FIG. 2 shows on a larger scale the whole of part I, as well as the beginning of part II, up to the abscissa X=0.215.

At point 0 of the leading edge, the radius of curvature is chosen to be between 1.50% and 2% of the length c of the chord of the airfoil. It is preferably close to 1.74%.

Between point 0 and point F of abscissa X=0.0257 (cf. the portion of curve 10 in FIG. 2), the upper surface line $Y_2$ approximately follows an equation of the type:

$$Y_2 = e_{max} \cdot [-6{,}259\ X^{3/2} + 1{,}523\ X^{\frac{1}{2}} - 0{,}088]. \tag{1}$$

Between point F and the point G of abscissa X=0.0572 (cf. the portion of curve 11 in FIG. 2), the upper surface line $Y_2$ approximately follows an equation of the type $$Y_2 = e_{max} \cdot [-1{.}471\ X^{3/2} + 1{,}173\ X^{\frac{1}{2}} - 0{,}0515]. \tag{2}$$

Between point G, belonging to zone I, and point H, belonging to zone II and located at the point of abscissa X=0.215 (cf. the portion of curve 12 in FIG. 2), the upper surface line is defined by the equation:

$$Y_2 = e_{max} \cdot [-0{,}577\ X^{3/2} + 1{,}032\ X^{\frac{1}{2}} - 0{,}030]. \tag{3}$$

Similarly, concerning the lower surface, between point O of the leading edge and point F' of abscissa X=0.0257 (cf. the portion of curve 12 in FIG. 2), the lower surface line follows, at least approximately the equation:

$$Y_1 = e_{max} \cdot [6{,}776\ X^{3/2} - 1{,}497\ X^{\frac{1}{2}} - 0{,}088]. \tag{4}$$

Between point F' and point G', of abscissa X=0.0572 (cf. the portion of curve 14 in FIG. 2), the lower surface line follows at least approximately the equation:

$$Y_1 = e_{max} \cdot [2{,}9X^{3/2} - 1{,}171X^{\frac{1}{2}} - 0{,}124]. \tag{5}$$

Between point G' of zone I and point I' belonging to zone II and located at the abscissa X=0.153, the lower surface line G'I', designated by reference 15 in FIG. 2, follows at least approximately the equation:

$$Y_1 = e_{max} \cdot [0{,}032X^{3/2} - 0{,}694X^{\frac{1}{2}} - 0{,}199]. \tag{6}$$

In the median zone II, the thickness $Y_0$ of the airfoil, defined by the sum at a point of abscissa X of the ordinate of the lower surface and of the ordinate of the upper surface, i.e. as approximately equal to the thickness of the airfoil, is advantageously of the type:

$$Y_0 = e_{max} \cdot [5{,}477X - 7{,}564X^2]^{\frac{1}{2}}. \tag{7}$$

Concerning the definition of the upper surface line in this zone II, from point H for which X=0.215 to a point defined by X=0.439, an equation of the following type may be used:

$$Y_2 = e_{max} \cdot [-0{,}814X^{3/2} + 1{,}182X^{\frac{1}{2}} - 0{,}076] \tag{8}$$

and from the point defined by X=0.439 to a point of zone III defined by X=0.600 (cf. portion of curve 16 in FIG. 3), the equation:

$$Y_2 = e_{max} \cdot [-1{,}238X^{3/2} + 1{,}742X^{\frac{1}{2}} - 0{,}324]. \tag{9}$$

In the intermediate zone before $III_1$, the thickness $Y_0$ follows at least approximately an equation of the type:

$$Y_0 = e_{max} \cdot [-1{,}805X + 1{,}848] \tag{10}$$

such an equation also being valid for the rear zone $III_2$. Concerning the upper surface line, it may follow, between points J of abscissa 0.600 and K of abscissa 0.750, (curve portion 17 in FIG. 3), the following equation:

$$Y_2 = e_{max} \cdot [-2{,}016X^{3/2} + 3{,}149X^{\frac{1}{2}} - 1{,}052] \tag{11}$$

and between point K and point L of abscissa X=0.846 (curve portion 18), the equation:

$$Y_2 = e_{max} \cdot [-3{,}102X^{3/2} + 5{,}600X^{\frac{1}{2}} - 2{,}469]. \tag{12}$$

Then, from point L to point E of the trailing edge, the upper surface line (curve 19 of FIG. 4) may be defined by:

$$Y_2 = e_{max} \cdot [-3{,}177X^{3/2} + 5{,}746X^{\frac{1}{2}} - 2{,}545]. \tag{13}$$

Between point Q' of abscissa X=0.714 and point L' of abscissa X=0.846 (curve 20 of FIGS. 3 and 4), the lower surface is defined at least approximately by the equation:

$$Y_1 = e_{max} \cdot [-3{,}029X^{3/2} + 8{,}529X^{\frac{1}{2}} - 5{,}544] \tag{14}$$

then between points L' and E', by the equation (curve 21 of FIG. 4):

$$Y_1 = e_{max} \cdot [-0538X^{3/2} + 2{,}186\ X^{\frac{1}{2}} - 1{,}648]. \tag{15}$$

The tangent of the angle α formed between the tangents at E and E' to the upper surface and to the lower surface is close to tan $\alpha = 2.18 \cdot e_{max}$.

Thus, part I makes it possible to develop a range of speeds near the leading edge, which ensures a suitable functioning at low speeds whilst advantageously delaying stalls at high incidences. Part II ensures the continuity of the flow in cooperation with part III, so as to allow the establishment of a stabilized shock wave at all the high speed flight configurations. Finally, parts III and IV allow an optimum recompression of the fluid towards the rear, avoiding in the flow the appearance of an excessive pressure gradient.

Figure 5:
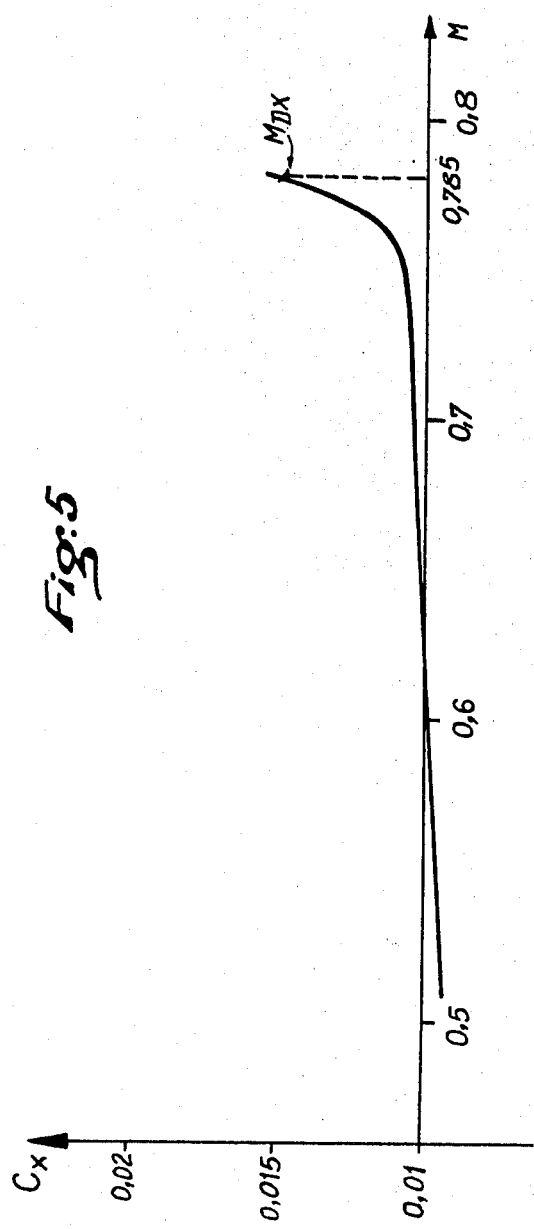
FIG. 5 shows the characteristic curve of the drag as a function of the speed, for the embodiment of FIGS. 2 to 4.

FIG. 5 shows the variation of the coefficient of drag $C_X$ as a function of the Mach number for a coefficient of lift $C_Z$ of the order of 0.6. This figure, which illustrates the results obtained in drag for an airfoil of which the maximum relative thickness is 12.58%, makes it possible to assess the divergence Mach number at 0.785. The low level of the drags measured and the high value of the divergence Mach number depend strictly on the characteristic points of parts of curvature of the airfoil as well as on its analytic definition. In fact, the contour of the airfoil according to the invention is optimized to obtain, in particular, a minimum drag and the modification of part of the airfoil, as indicated for example by the broken lines 22 and 23 of FIG. 4, said modification occuring after the points of maximum curvature of the upper surface and of the lower surface, would bring about an increase in the drag.

In addition, as shown in FIG. 6, if the curve representing the coefficient of lift $C_Z$ as a function of the divergence Mach number is schematically plotted, it is observed that the maximum divergence Mach number 0.785, is valid for a range of $C_Z$ included approximately between 0.3 and 0.6.

A range of adaptation is therefore obtained for the $C_Z$, whilst usually a single punctual value of $C_Z$ corresponds to the divergence Mach number, this range being given for a Reynolds number close to $6 \times 10^6$. Such a range corresponds to the one usually used for the wings of aircraft travelling at high subsonic speeds. It therefore ensures for an aircraft provided with the airfoil according to the present invention, several possibilities of cruising flight whilst benefitting from the same maximum divergence Mach number.

FIG. 7 illustrates the distribution of the pressures on the upper surface (for a Mach number close to 0.72) of the airfoil as a function of the reduced abscissa X and for different coefficients of lift $C_Z$. It is seen that, between X=0 and X<0.4, the different curves present a supersonic zone 30, then downstream of the reduced abscissa 0.4 and therefore on more than half of the chord, a large subsonic zone 31, with convex diminution of the pressures without appearance of an excessive gradient.

The curve 40, which schematises a known flow, of the type with quasi-uniform distribution of the speeds on the upper surface, enables the particular and different functioning of an airfoil according to the invention to be shown with respect to curves 30.

What is claimed is:

1. An airfoil for flight at high subsonic speeds, comprising a thick leading edge, a trailing edge, a convex upper surface, and a lower surface which is convex towards the leading edge and concave towards the trailing edge, wherein said upper surface comprises a point of maximum convex curvature within a first zone extending from 65% to 90% of the chord of the airfoil from said leading edge, the thickness of the airfoil at said point of maximum convex curvature being about three-tenths of the maximum thickness thereof, and wherein the lower surface comprises a point of maximum concave curvature in an intermediate zone extending from 70% to 93% of the chord of the airfoil from the leading edge, and, at said point of maximum concave curvature, the thickness of the airfoil is about half the maximum thickness thereof;

said lower surface, in a zone adjacent its trailing edge, being represented by the formula $$Y = e_{max}(-0.538 X^{3/2} + 2.186 X^{\frac{1}{2}} - 1.648)$$

wherein $e_{max}$ represents the maximum thickness of the airfoil and X has the values $0.846 < x < 1$, when related to a coordinate system having an origin O and rectangular axes OX, OY on which are respectively plotted reduced abscissae X and ordinates Y defining the airfoil, the origin O being located at the leading edge and the axis OX coinciding with the chord of the airfoil.

2. An airfoil in accordance with claim 1 comprising a second zone in which the thickness of the airfoil decreases linearly toward said trailing edge, said zone beginning at a point intermediate said leading edge and said point of maximum curvature of the upper surface.

3. An airfoil in accordance with claim 2 wherein said second zone extends from mid-chord to 80% of the chord from the leading edge.

4. An airfoil in accordance with claim 2 wherein said second zone extends from mid-chord to substantially the trailing edge.

5. An airfoil in accordance with claim 1 wherein said lower surface and said upper surface form at the trailing edge an angle whose tangent is between 2 and 2.3 times the ratio of the maximum thickness of the airfoil to the chord thereof.

6. An airfoil in accordance with claim 1 wherein the thickness of the trailing edge is not more than 0.5% of the length of the chord.

7. The airfoil of claim 1, wherein, in a third zone extending from 12% to 25% of the chord from the leading edge, said lower surface has a substantially constant convex curvature.

8. The airfoil of claim 7, wherein, in a fourth zone extending from 30% to 45% of the chord from the leading edge, said lower surface has a point of maximum convex curvature.

9. The airfoil of claim 1, related to a coordinate system having an origin O and rectangular axes OX, OY on which are respectively plotted reduced abscissae X and ordinates Y defining the airfoil, the origin O being located at the leading edge and the axis OX coinciding with the chord of the airfoil, wherein, in a leading edge zone extending from the leading edge to a reduced abscissa between about 0.1 and 0.16, and in a trailing edge zone extending from a reduced abscissa of about 0.70 to a reduced abscissa of about 0.846, the lower surface is formed of consecutive portions of curves having the formula $$Y = e_{max} \cdot [a X^{3/2} + b X^{\frac{1}{2}} + c]$$

in which $e_{max}$ designates the maximum thickness of the airfoil, and a, b, and c are constants associated with each of said portions of curves.

10. The airfoil of claim 9 wherein, in said leading edge zone, the constants a, b and c have, as a function of the reduced abscissa X, the following values:

|   | 0<X<0.0257 | 0.0257<X<0.0572 | 0.0572<X<0.153 |
|---|---|---|---|
| a | 6.776 | 2.9 | 0.032 |
| b | −1.497 | −1.171 | −0.694 |
| c | 0.088 | −0.124 | −0.199 | and in said trailing edge zone, the constants a, b and c have, as a function of the reduced abscissa X, the following values:

|   | 0.714<X<0.846 |
|---|---|
| a | −3.029 |
| b | 8.529 |
| c | −5.544. |

11. The airfoil of claim 1 related to a coordinate system having an origin O and rectangular axes OX, OY on which are respectively plotted reduced abscissae X and ordinates Y defining the airfoil, the origin O being located at the leading edge, while the axis OX coincides with the chord of the airfoil, wherein from the leading edge to the trailing edge, the upper surface is formed of consecutive portions of curves having the formula $$Y = e_{max} \cdot [k_1 X^{3/2} + k_2 X^{\frac{1}{2}} + m]$$

in which $e_{max}$ designates the maximum thickness of the airfoil, and $k_1$, $k_2$ and m are constants associated with each of said portions of curves.

12. The airfoil of claim 11 wherein as a function of the reduced abscissa X, the constants $k_1$, $k_2$ and m have the following values:

|   | 0<X<0.0257 | 0.0257<x<0.0572 | 0.0572<X<0.125 | 0.215<X<0.439 | 0.439<X<0.600 |
|---|---|---|---|---|---|
| $k_1$ | −6.259 | −1.471 | −0.577 | −0.814 | −1.238 |
| $k_2$ | 1.523 | 1.173 | 1.032 | 0.182 | 1.742 |
| m | −0.088 | −0.0515 | −0.030 | −0.076 | −0.324 |

|   | 0.600<X<0.750 | 0.750<X<0.846 | 0.846<X<1 |
|---|---|---|---|
| $k_1$ | −2.016 | −3.102 | −3.177 |
| $k_2$ | 3.149 | 5.600 | 5.746 |
| m | −1.052 | −2.469 | −2.545 |

13. The airfoil of claim 1, related to a coordinate system having an origin O and rectangular axes OX, OY on which are respectively plotted reduced abscissae X and ordinates Y defining the airfoil, the origin O being located at the leading edge, while the axis OX coincides with the chord of the airfoil, wherein, in a median zone extending between reduced abscissae equal to 0.1 and to 0.6, the thickness $Y_0$ of the airfoil has the formula:

$$Y_0 = e_{max} \cdot [pX + qX^2]^{\frac{1}{2}}$$

in which $e_{max}$ designates the maximum thickness of the airfoil, and p and q are constants.

14. The airfoil of claim 13, wherein p and q have the values 5.477 and −7.564, respectively.

15. The airfoil of claim 2, related to a coordinate system having an origin O and rectangular axes OX, OY on which are respectively plotted reduced abscissae X and ordinates Y defining the airfoil, the origin O being located at the leading edge, while the axis OX coincides with the chord of the airfoil, wherein said second zone extends between reduced abscissae having the values 0.5 and 1.0, in which zone the thickness $Y_0$ of the airfoil has the formula:

$$Y_0 = e_{max} \cdot [rX + s]$$

in which $e_{max}$ designates the maximum thickness of the airfoil, and r and s are constants.

16. The airfoil of claim 15, wherein said second zone extends between reduced abscissae having the values 0.5 and 0.8.

17. The airfoil of claims 15 or 16 wherein r and s have the values −1.805 and 1.848, respectively.

18. An airfoil in accordance with claim 1, wherein the maximum thickness of the airfoil is 12.58% of the length of the chord, the point of maximum curvature of the upper surface occurs at about 85% of the chord length from the leading edge, the radius of curvature at the point of maximum curvature of the upper surface is about 172% of the chord, the angle formed by lines respectively tangent to the lower surface and to the upper surface at the trailing edge is between 15° and 16°, the point of maximum concave curvature of the lower surface occurs at about 76% of the chord length from the leading edge, the radius of curvature at the point of maximum concave curvature is about 132% of the chord, the lower surface has, in a zone extending between about 12% and 25% of the chord length from the leading edge a substantially constant convex curvature having a radius of about 179% of the chord and the lower surface has a point of maximum convex curvature at about 37% of the chord length from the leading edge, the radius of curvature at the point of maximum convex curvature of the lower surface being about 119% of the chord.

* * * * *